(12) United States Patent
Philipsson

(10) Patent No.: US 6,389,443 B1
(45) Date of Patent: May 14, 2002

(54) METHOD AND APPARATUS FOR AN EFFICIENT SQUARE-ROOT COMPUTATION

(75) Inventor: John Philipsson, Lund (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/326,290

(22) Filed: Jun. 7, 1999

(51) Int. Cl.⁷ .................................................. G06F 7/38

(52) U.S. Cl. ..................................................... 708/605

(58) Field of Search .............................. 708/502, 504, 708/510, 605, 650, 654

(56) References Cited

U.S. PATENT DOCUMENTS

| | | |
|---|---|---|
| 4,336,599 A | 6/1982 | Wong |
| 4,949,296 A * | 8/1990 | Malinowski ................. 708/605 |
| 5,157,624 A | 10/1992 | Hesson |
| 5,341,321 A | 8/1994 | Karp et al. |
| H1385 H | 12/1994 | Stickel et al. |
| 5,386,375 A | 1/1995 | Smith |
| 5,537,345 A | 7/1996 | Nakano |
| 5,539,682 A | 7/1996 | Jain et al. |
| 5,602,768 A | 2/1997 | Cunto et al. |

OTHER PUBLICATIONS

Fast Algorithm Computes Square Root by Bruce Komusin; EDN Electrical Design News; vol. 32, No. 24; Nov. 26, 1987, pp. 250–252, XP000717382.

An Algorithm for High Speed Square Roots by Bob Conover and Donald L. Gustafson; Proceedings of the Region 5 Conference, Lubbock, Texas, Mar. 13–15, 1985, Mar. 1, 1985, pp. 19–21; XP000758038; Institute of Electrical and Electronics Engineers.

Square Root Algorithms for Integer and Floating–Point Numbers by Reza Hashemian; IEEE Transactions on Computers, vol. 39, No. 8; Aug. 1, 1990, pp. 1025–1029, XP000143033.

* cited by examiner

Primary Examiner—Chuong Dinh Ngo
(74) Attorney, Agent, or Firm—Jenkens & Gilchrist, P.C.

(57) ABSTRACT

The number X is a number whose square root is to be computed efficiently. A first register of a processor is set to the number X. A second register of the processor is set to a number L, wherein the number L indicates a number of significant bits of X. The number L is shifted right in the second register by one bit to produce a number N. The number X is shifted right in the first register by N bits to produce a number X1. A third register of the processor is set to 1 and shifted left by N bits to produce the result N1 in the third register. The results N1 and X1 are added and shifted right by one bit to produce an approximation to the square root of X.

17 Claims, 3 Drawing Sheets

US 6,389,443 B1

METHOD AND APPARATUS FOR AN EFFICIENT SQUARE-ROOT COMPUTATION

FIELD OF THE INVENTION

The present invention relates generally to a square-root computation, and, more particularly, to a square-root computation embodied in a fixed-point processor or an Application Specific Integrated Circuit (ASIC).

BACKGROUND OF THE INVENTION

In many real time applications, the square root operation serves as an "inner loop" operation, i.e. an operation called repeatedly as a subroutine by other subroutines of an application. Thus, the ultimate efficiency of a real time application is critically dependent on the efficiency of an underlying square root operation. In particular, this is true in audio signal processing and compression applications.

Computing the square root of any number can be a complicated and intensive computation. A fixed-point processor typically does not directly support this type of operation. That is, a fixed-point processor typically does not have a built-in instruction to compute a square root. If any application requires this function it must be implemented as an approximation in the software. The accuracy of the approximation depends significantly on the complexity of the calculations. Better approximations need more calculations and, conversely, more calculations produce better approximations.

A common technique for computing a square root operation is an iterative process called the Newton-Raphson technique. The Newton-Raphson technique is implemented using the following equation:

$$x(n+1) = \frac{1}{2}(x(n) + a/x(n))$$

The number "a" designates the number for which the square root is to be computed. The iterative process starts with n=0. The iterative process then proceeds with x(n+1) being calculated as a function of x(n) where n=1, 2, ... N. The number of iteration cycles N needed to achieve an accurate approximation to the square root may be minimized by carefully choosing a start value. A well-chosen start value x(0) is typically stored in a predefined lookup-table.

The main problem with the Newton-Raphson technique is that a high computational load is needed to make the final result reliable. In many cases this technique is so computationally intensive, that further approximation must be done to make the calculation efficient. This will of course give an even more imprecise result. Another problem is that the look-up table occupies expensive memory area.

In view of the foregoing, it would be desirable to provide a technique which overcomes the above-described inadequacies and shortcomings. More particularly, it would be desirable to provide a technique for calculating the square root of a number in an efficient and cost effective manner.

SUMMARY OF THE INVENTION

According to the present invention, a technique for efficiently computing an approximation to the square root of a number X is provided. The number X is typically represented in a fixed-point binary form. In one embodiment, the technique can be realized by setting a first register of a processor to the number X. A second register of the processor is set to a number L, wherein the number L indicates a number of significant bits of X. The number L is right shifted in the second register by one bit to produce a number N. The number X is right shifted in the first register by N bits to produce a number X1. A third register of the processor is set to 1 and left shifted by N bits to produce the result N1 in the third register. The results N1 and X1 are added and shifted right by one bit to produce an approximation to the square root of X. Typically, the processor is a general purpose computer system, but may also be an Application Specific Integrated Circuit.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
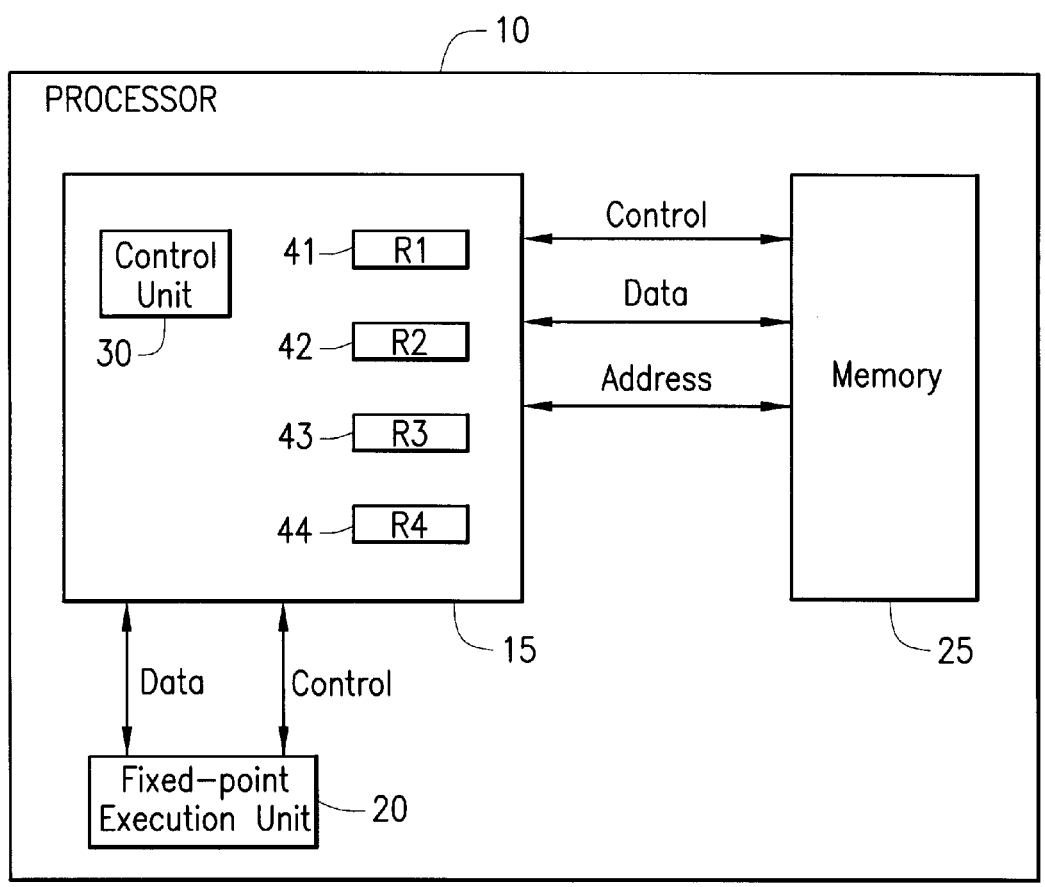
FIG. 1 is a block diagram of a processor for performing a square root in accordance with the present invention.

FIG. 1 is a block diagram illustrating a processor 10 for implementing the present invention, including a central processing unit (CPU) 15, at least one fixed-point execution unit 20, and a random access memory 25. The CPU 15 includes a control unit 30 and registers 41–44 representative of a set of one or more registers which may be assigned to the CPU 15.

The CPU 15 controls the transfer of data to the memory 25 through one or more data lines, one or more control lines, and one or more address lines. The memory 25 is capable of holding one or more memory instructions of a software program. The CPU 15 and the fixed-point execution unit 20 are coupled together by one or more control lines and one or more data lines for the transfer of data.

The control unit 30 controls parts of the processor 10, including the fixed-point unit 20 and the memory 25. The registers 41–44 are capable of being written to and read from. The fixed-point execution unit 20 is exemplary of one or more arithmetic logic units of the processor 10. The control unit 30 is configured to perform various operations on the register set 41–44 including a shift left (SL) operation and a shift right (SR) operation. The shift left operation shifts the bits of a register left by one bit. The shift right operation shifts the bits of a register right by one bit.

The processor 10 is representative of a processor on which the present invention can be implemented. Other various embodiments are possible, for example, the processor 10 could be a multiproccesor system having one or more processors, or a microprocessor embedded in a real time application, such as on a signal processor board. Alternatively, the processor 10 may be part of an Application Specific Integrated Circuit (ASIC) chip.

Figure 2:
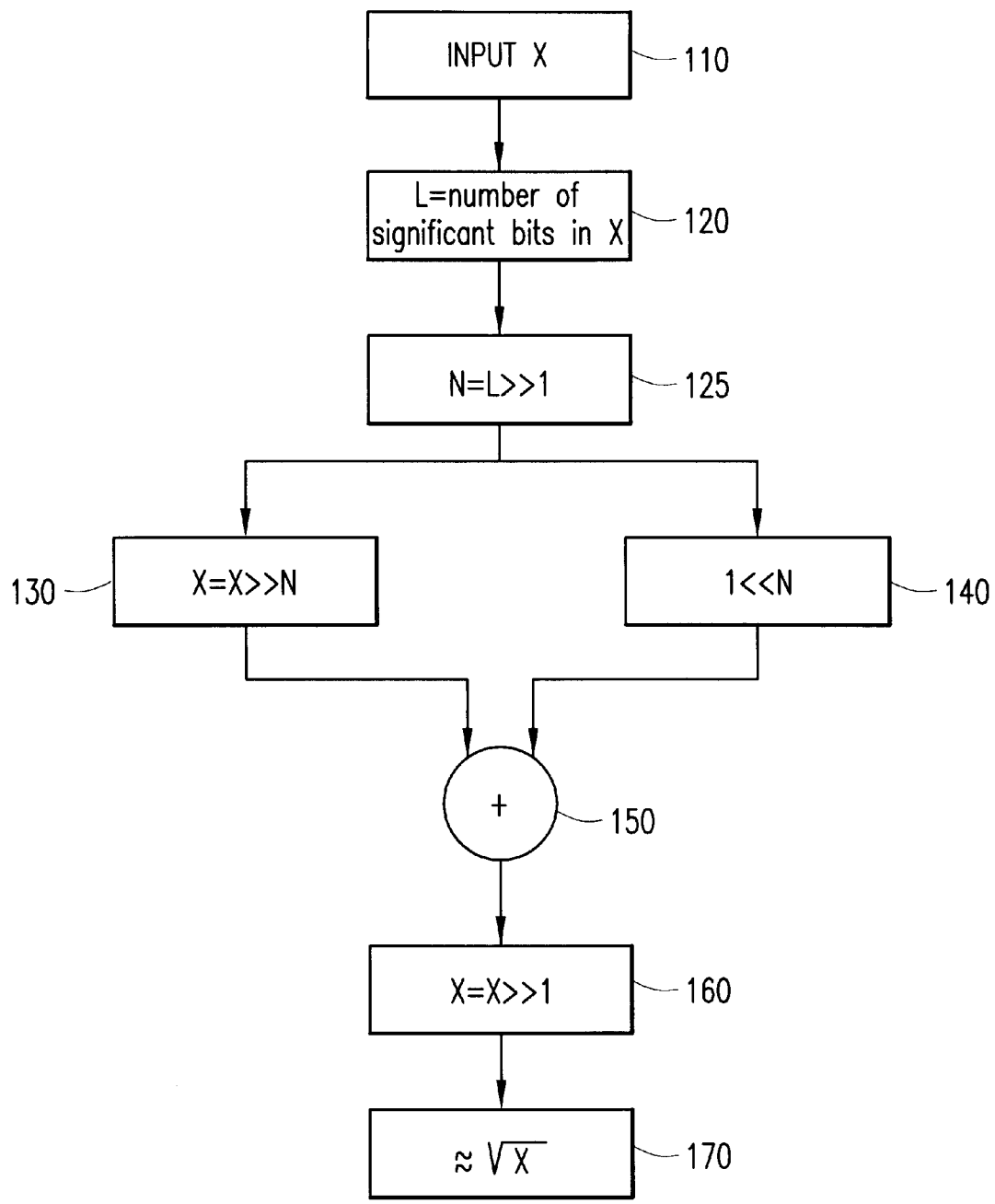
FIG. 2 is a logic diagram illustrating calculations for performing a square root in accordance with the present invention.

FIG. 2 illustrates a logic diagram that the processor 10 may incorporate to implement the present invention. In step 110, a first register 41 of the processor 10 is set to a number X, wherein the number X is a number whose square root is to be computed. In step 120, a number L is determined to initially be the number of significant bits in the number X. The significant bits of a register are the bits of the register necessary to defining a value (e.g., a number) represented by that register. A second register 42 of the processor 10 is set to the number L. In step 125, a number N is determined by shifting right one bit the bits in register 42 holding the number L, i.e., fixing L, and then dividing L by two. In step 130, the register 41 holding the number X is shifted right by the N bits of register 42 producing the result X1. In step 140, a register 43 is initially set to the integer 1. Register 43 is then shifted left by the N bits of register 42 producing the number N1. In step 150, the contents of register 41 resulting from step 130 and the contents of register 43 resulting from step 140 are added to yield an intermediate result which replaces the value in register 41. In step 160, register 41 holding the intermediate result is right shifted by one bit and the result is an approximation to the square root of X (in step 170). In an alternate embodiment, in step 150, the intermediate result could be put into a fourth register 44.

In the above example, the logic diagram of FIG. 2 was implemented using registers 41–44 and the operations of control unit 30 of processor 10. However, in another embodiment, the operations of the logic diagram of FIG. 2 could be wholly implemented within the fixed-point unit 20.

An example now illustrates how to compute the square root of the number $X=(1123)_{10}$ according to the present invention. The numbers in base 10 are included in this example for the purpose of understanding only. The actual operations are performed in the registers of processor 10 in base 2 arithmetic. In step 110, the algorithm starts with the number $X=1123_{10}=10001100011_2$ for which the square root is to be determined. In step 120, the number of significant bits L is determined to be $11_{10}=1011_2$ because eleven bits are necessary to express the integer $1123_{10}$. In step 125, the number N is determined by right shifting the number L by 1 bit, i.e. $N=101_{12}>>1=101_2=5_{10}$. In step 130, the number X is right shifted by N bits, i.e., $10001100011_2>>N=100011_2=35_{10}$ where N=5. In step 140, the number 1 is left shifted N bits, and in this example N=5 so that $1<<N=2^N=2^5=100000_2=32_{10}$. In step 150, the result of step 130 and the result of step 140 are added together to yield an intermediate result, i.e., $100011_2+100000_2=35_{10}+32_{10}=1000011_2=67_{10}$. In step 160, the intermediate result is right shifted by one bit, i.e., $67_{10}=1000011_2>>1=100001_2=33_{10}$. In step 170, the result $33_{10}$, is output. The result $33_{10}$ is an approximation of the actual value $33.51_{10}$ of the square root of $1123_{10}$ in a fixed-point processor.

Figure 3:
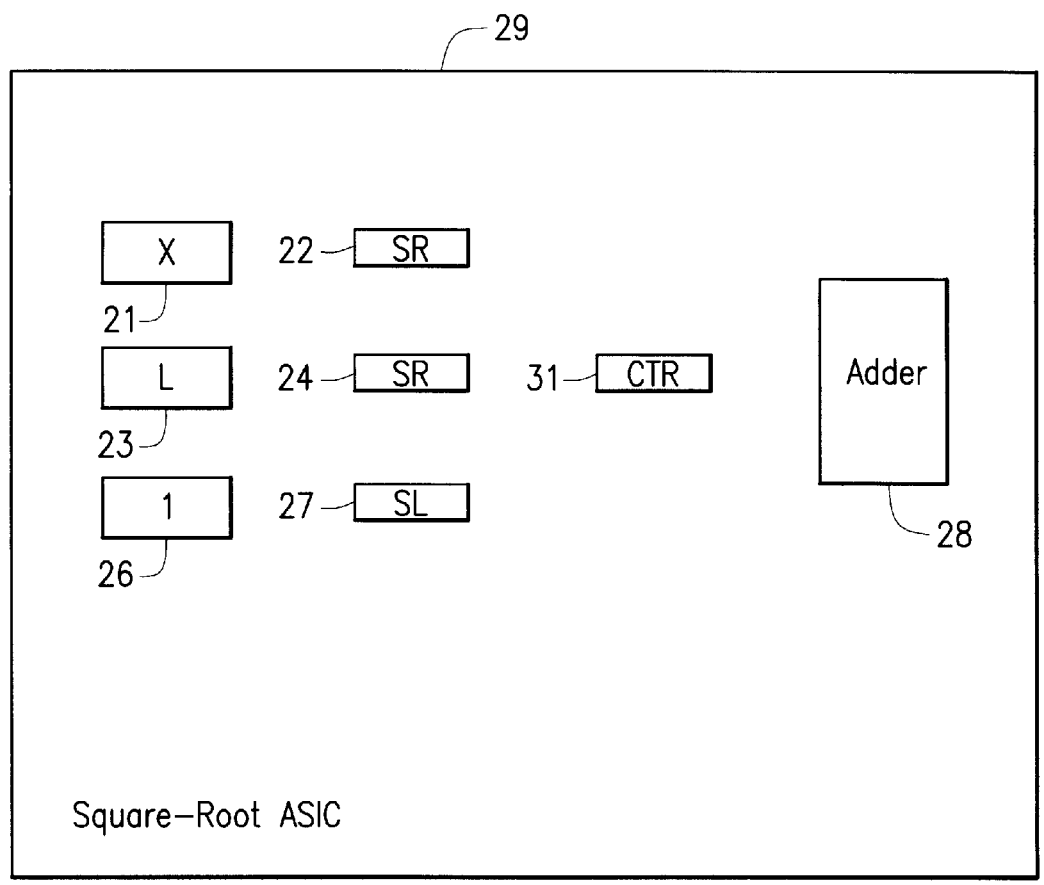
FIG. 3 is a block diagram of a second embodiment for performing a square root in accordance with the present invention.

FIG. 3 is a second embodiment of a square-root ASIC 29 for computing a square root according to the present invention. The square-root ASIC 29 could be an ASIC chip implementation of the fixed-point execution unit 20, or part of a real time embedded system for an application typically requiring quick response time such as audio signal processing. The square-root ASIC 29 comprises a register 21 for holding the value X, a register 23 for holding the value L, a register 26 for holding the value 1, a shift right unit 22 for shifting right the data bits of register 21, a shift right unit 24 for shifting right the bits of register 23, a counter 31 for counting the significant bits of register 23, a register 26 for holding the number 1, a shift left unit 27 for shifting left the bits of register 26, and an adder 28.

The ASIC 29 is designed to perform the square root computation by defining the interconnections of the basic components shown in FIG. 3 according to the logic diagram of FIG. 2. The first register 21 stores the number X and is operated on by the shift right (SR) unit 22. The counter 31 computes the number of significant bits in the first register 21 and stores the result L in the second register 23. The second register 23 is shifted right by one bit by the shift right (SR) unit 24 to produce the number N. The shift right unit 22 coupled to the first register 21 right shifts the number X in the first register 21 by N bits as indicated by the second register 23. The third register 26 is preset to hold a binary form of the number 1. The shift left (SL) unit 27 shifts the number 1 of the third register 26 left by N bits. The adder 28 adds the contents of the first register 21 and the third register 26 and stores the result in the first register 21. The first register 21 is then shifted right by one bit to produce the approximation to the square root of X.

The present invention typically produces a square root value having a deviation from the theoretical value below 1%, or, in other words, there is a Signal to Noise Ratio (SNR) of 35–40 DB between the approximation to the square root obtained using the present invention and the theoretical value of the square root. This deviation includes a quantization error of the fixed-point process. Thus, the method and apparatus of the present invention provides a solution which has the advantage of both low complexity and high accuracy. The present invention is easy to implement either as a hardware ASIC or as a flow of instructions in a fixed-point processor. In addition, there is no need for look-up tables in the memory.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for computing a square root of a number in a processor, the method comprising the steps of:

setting a first register of the processor to a number X, wherein the number X is a number whose square root is to be computed;

setting a second register of the processor to a number L, wherein the number L indicates a number of significant bits of the number X;

shifting right the number L in the second register by one bit to produce a number N;

shifting right the number X in the first register by N bits to produce a number X1;

shifting left a third register of the processor set to 1 by N bits to produce a result N1 in the third register;

adding the results N1 and X1 to produce an intermediate result; and shifting right by 1 bit the intermediate result to produce an approximation to the square root of X.

2. The method of claim 1, wherein the intermediate result is stored in a fourth register.

3. The method of claim 1, wherein the intermediate result is stored in the first register.

4. The method of claim 1, wherein the number X is an integer represented in a fixed-point binary form.

5. The method of claim 1, wherein each of the registers holds a plurality of bits.

6. The method of claim 1, wherein the processor is a general purpose computer system.

7. The method of claim 1, wherein the processor is an Application Specific Integrated Circuit.

8. An apparatus for computing a square root of a number X, the apparatus comprising:

a first register for storing the number X;

a second register for storing a number L, wherein the number L indicates a number of significant bits of the number X;

a third register for storing a number 1; and a computing unit configured to:

shift right the number L in the second register by one bit to produce a number N;

shift right the number X in the first register by N bits to produce a result X1;

shift left the number 1 in the third register by N bits to produce the result N1;

add the results X1 and N1 to produce an intermediate result; and shift right by 1 bit the intermediate result to produce an approximation to the square root of X.

9. The apparatus of claim 8, wherein the intermediate result is stored in the first register.

10. The apparatus of claim 8, wherein the computing unit is further configured to calculate the number L.

11. The apparatus of claim 8, further comprising:

a memory for storing a software program which calls the computing unit at least once to determine the approximation to the square root of X.

12. An article of manufacture for computing a squire root, comprising:

a first register for storing a number X, wherein X is a number whose square root is to be computed;

a first shift right unit operating on the first register;

a second register for storing a number L, wherein the number L indicates, a number of significant bits of the number X, a second shift right unit operating on the second register for shifting right the number L in the second register by one bit yielding the number N, the first shift right unit shifting right the number X in the first register by the number N;

a third register for holding a binary form of the number 1;

a shift left unit for shifting left the number 1 of the third register by N bits; and an adder adding the first register and the third register to produce an intermediate result; and a third shift right unit for shifting right the intermediate result by one bit to produce an approximation to the square root of X.

13. The article of manufacture of claim 12, wherein the article of manufacture is implemented as an Application Specific Integrated Circuit.

14. The article of manufacture of claim 12, further comprising:

a counter unit for determining L by counting the number of significant bits in the first register.

15. The article of manufacture of claim 12, wherein the first shift right unit, the second shift right unit, and the third shift right unit are the same shift right unit.

16. An article of manufacture, comprising:

a computer readable storage medium; and computer programming stored on the storage medium; wherein the stored computer programming is configured to be readable from the computer readable storage medium by at least one computer and thereby cause the at least one computer to operate so as to:

store a number X in a first register, wherein X is a number whose square root is to be computed;

store a number L is a second register, wherein the number L indicates a number of significant bits of the number X;

shift right the number L in the second register by 1 bit resulting in a number N;

shift right the number X in the first register by N bits;

store a number 1 in a third register;

shift left the number 1 in the third register by N bits;

add the first register and the third register to produce an intermediate result; and shift right by one bit the intermediate result to produce and approximation to the square root of X.

17. The article of manufacture of claim 16, further causing the at least one computer to operate so as to:

determine the number L by counting the number of significant bits of the number X.

* * * * *